United States Patent
Drego et al.

(10) Patent No.: US 10,824,370 B2
(45) Date of Patent: Nov. 3, 2020

(54) SYSTEMS AND METHODS FOR IMPLEMENTING RANDOM ACCESS MEMORY IN A FLOW-BASED MACHINE PERCEPTION AND DENSE ALGORITHM INTEGRATED CIRCUIT BASED ON COMPUTING AND COALESCING OF INDICES

(71) Applicant: quadric.io, Inc., Burlingame, CA (US)

(72) Inventors: Nigel Drego, Burlingame, CA (US); Aman Sikka, Burlingame, CA (US); Mrinalini Ravichandran, Burlingame, CA (US); Robert Daniel Firu, Burlingame, CA (US); Veerbhan Kheterpal, Burlingame, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

(21) Appl. No.: 16/778,578

(22) Filed: Jan. 31, 2020

(65) Prior Publication Data

US 2020/0257467 A1    Aug. 13, 2020

Related U.S. Application Data

(60) Provisional application No. 62/802,346, filed on Feb. 7, 2019.

(51) Int. Cl.
*G06F 3/06* (2006.01)
*G06F 12/1027* (2016.01)
(Continued)

(52) U.S. Cl.
CPC .......... *G06F 3/0656* (2013.01); *G06F 3/0685* (2013.01); *G06F 5/065* (2013.01);
(Continued)

(58) Field of Classification Search
CPC ...... G06F 3/0656; G06F 3/0685; G06F 5/065; G06F 9/3012; G06F 12/1027;
(Continued)

(56) References Cited

U.S. PATENT DOCUMENTS

| | | | |
|---|---|---|---|
| 9,710,265 B1 * | 7/2017 | Temam | G06N 3/04 |
| 2006/0277392 A1 * | 12/2006 | Bittner | G06F 9/325 |
| | | | 712/25 |

(Continued)

*Primary Examiner* — Aimee Li
*Assistant Examiner* — Shawn Doman
(74) *Attorney, Agent, or Firm* — Padowithz Alce

(57) ABSTRACT

A system and method for random access augmented flow-based processing within an integrated circuit includes computing, by a plurality of distinct processing cores, a plurality of linear indices and associated valid bits; propagating the plurality of linear indices in a predetermined manner to a plurality of columns of first-in, first-out buffers; loading, from the FIFO buffers, the plurality of linear indices to a content addressable memory; at the CAM: coalescing redundant linear indices in each of the plurality of FIFO buffers; performing lookups for a plurality of memory addresses based on the plurality of linear indices; collecting at a read data buffer a plurality of distinct pieces of data from one of an on-chip memory based on the plurality of memory addresses; reading the plurality of distinct pieces of data from the read data buffer; and propagating the plurality of distinct pieces of data into the processing cores.

15 Claims, 9 Drawing Sheets

(51) Int. Cl.
*G06F 9/30* (2018.01)
*G06N 3/04* (2006.01)
*G06F 5/06* (2006.01)

(52) U.S. Cl.
CPC ........ *G06F 9/3012* (2013.01); *G06F 12/1027* (2013.01); *G06N 3/04* (2013.01); *G06F 3/0611* (2013.01)

(58) Field of Classification Search
CPC .... G06F 3/0641; G06F 9/3881; G06F 9/3885; G06F 9/3891; G06F 9/3893; G06F 9/3895; G06F 15/80; G06F 15/82; G06F 15/8023; G06F 15/17381; G06F 15/8061; G06F 15/8069; G06N 3/04
USPC ............................................ 712/18, 16, 225
See application file for complete search history.

(56) References Cited

U.S. PATENT DOCUMENTS

| | | | |
|---|---|---|---|
| 2007/0050603 A1* | 3/2007 | Vorbach | G06F 9/3455 712/221 |
| 2011/0138149 A1* | 6/2011 | Karlsson | G06F 12/1027 711/207 |
| 2012/0257626 A1* | 10/2012 | McGhee | H04L 43/028 370/392 |
| 2014/0136759 A1* | 5/2014 | Sprouse | G11C 11/5642 711/103 |
| 2014/0173192 A1* | 6/2014 | Omtzigt | G06F 15/8023 711/106 |
| 2015/0100757 A1* | 4/2015 | Burger | G06F 9/3828 712/20 |
| 2019/0026250 A1* | 1/2019 | Das Sarma | G06F 9/30043 |
| 2019/0155610 A1* | 5/2019 | Suk | G06F 3/0659 |
| 2019/0244141 A1* | 8/2019 | Sodani | G06F 12/0862 |
| 2019/0303168 A1* | 10/2019 | Fleming, Jr. | G06F 9/4494 |
| 2020/0050547 A1* | 2/2020 | Rustad | G06F 15/8023 |

* cited by examiner

Generating and Loading Indices S410

Implementing a Content Addressable Memory S420

Coalescing Indices in a Column S430

Coalescing Indices of Multiple Columns S440

Memory Addressing to an OCM S445

Reading from the Data Buffer S450

FIG. 4

SYSTEMS AND METHODS FOR IMPLEMENTING RANDOM ACCESS MEMORY IN A FLOW-BASED MACHINE PERCEPTION AND DENSE ALGORITHM INTEGRATED CIRCUIT BASED ON COMPUTING AND COALESCING OF INDICES

CROSS-REFERENCE TO RELATED APPLICATIONS

This application claims the benefit of U.S. Provisional Application No. 62/802,346, filed 7 Feb. 2019, which is incorporated in its entirety by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit that is capable of high performance and real-time processing and computing of routine and advanced sensor signals for enabling perception of robotics or any type or kind of perceptual machine.

The inventors of the inventions described in the present application have designed an integrated circuit architecture that allows for enhanced sensor data processing capabilities and have further discovered related methods for implementing the integrated circuit architecture for several purposes including for enabling perception of robotics and various machines.

SUMMARY OF THE INVENTION(S)

In one embodiment, a method for random access augmented flow-based processing within an integrated circuit includes computing, by a plurality of distinct processing cores of an integrated circuit, a plurality of linear indices and associated valid bits; propagating the plurality of linear indices in a predetermined manner to a plurality of columns of first-in, first-out (FIFO) buffers; loading, from the plurality of columns of FIFO buffers, the plurality of linear indices to a content addressable memory (CAM); at the CAM: coalescing redundant linear indices in each of the plurality of FIFO buffers; performing lookups for a plurality of memory addresses based on the plurality of linear indices; collecting at a read data buffer a plurality of distinct pieces of data from one of an on-chip memory and an off-chip memory based on the plurality of memory addresses; reading, by the plurality of columns of FIFO buffers, the plurality of distinct pieces of data from the read data buffer; and propagating the plurality of distinct pieces of data into the plurality of distinct processing cores.

In one embodiment, the integrated circuit comprises: the plurality of distinct processing cores, each processing core of the plurality of distinct processing cores comprising: one or more data processing circuits; and a register file; a plurality of border cores, each border core of the plurality of border cores comprising at least one register file.

In one embodiment, each of the plurality of linear indices relates to a distinct offset within a n-dimensional tensor that is distinct from a memory location or a memory address.

In one embodiment, distinct subsets of the plurality of processing cores define a plurality of distinct columns of processing elements; propagating the plurality of linear indices in the predetermined manner to the plurality of columns of FIFO buffers includes: propagating the plurality of linear indices along each of the plurality of distinct columns of processing elements in a predetermined direction towards the plurality of columns of FIFO buffers.

In one embodiment, the redundant linear indices relate to linear indices that are duplicative of prior linear indices within a FIFO column of the plurality of columns of FIFO buffers; coalescing the redundant linear indices includes: coalescing the redundant linear indices as a subset of the plurality of linear indices move along a single FIFO column of the plurality of columns of FIFO buffers.

In one embodiment, the redundant linear indices relate to linear indices that are duplicative of prior linear indices within a FIFO column of the plurality of columns of FIFO buffers; coalescing the redundant linear indices from the plurality of distinct processing cores includes: coalescing redundant linear indices along all the plurality of linear indices move along all the plurality of columns of FIFO buffers.

In one embodiment, the method includes updating, by the CAM, a count associated with a unique memory address based on the coalescence of the redundant linear indices.

In one embodiment, the method includes coalescing redundant memory address across a plurality of distinct columns of the CAM includes: broadcasting a target memory address from a subject column of the CAM to one or more of the plurality of distinct columns of the CAM, linear index data identifying a specific linear index loaded to the CAM;

In one embodiment, at each of the one or more of the plurality of distinct columns of the CAM receiving the broadcasting: performing an internal inspection; identifying whether a match exists between the target memory address and one or more entries of memory addresses of the respective CAM column of the plurality of distinct columns of the CAM.

In one embodiment, the method includes in response to identifying a match between the target memory address and one or more entries of memory addresses, designating the one or more entries of memory addresses matching the target memory address as previously processed; and forgoing a data fetch based on the designated one or more entries of memory addresses.

In one embodiment, the method includes implementing a crossbar between the read data buffer and the plurality of columns of FIFO buffers, wherein reading the plurality of distinct pieces of data from the read data buffer is performed via the crossbar.

In one embodiment, the method includes holding a line of data within the crossbar until each of the plurality of columns of FIFO buffers requiring one or more pieces of data from the line of data are satisfied.

In one embodiment, a method for random access augmented flow-based processing within an integrated circuit includes computing a plurality of indices and associated valid bits; propagating the plurality of indices to a plurality of peripheral buffers; loading the plurality of indices to an associative memory; at the associative memory: coalescing indistinct linear indices in each of the plurality of peripheral buffers; performing lookups for a plurality of memory addresses based on the plurality of linear indices; returning a plurality of distinct pieces of data from one of an on-chip memory and an off-chip memory based on the plurality of memory addresses; and propagating the plurality of distinct pieces of data into an array of processing cores of the integrated circuit.

In one embodiment, the integrated circuit includes a random access memory; an on-chip memory, wherein the associative memory comprises a content-addressable memory (CAM) that is in signal communication with the on-chip memory.

In one embodiment, the array of processing cores comprise a plurality of processing elements arranged in a plurality of distinct columns of processing elements; the CAM comprises a plurality of CAM entries arranged in a plurality of distinct CAM columns; the periphery buffers comprise a plurality of first-in, first-out (FIFO) buffers arranged in a plurality of distinct FIFO columns; a linear columnar alignment is defined by an alignment between: one distinct column of processing elements of the plurality of distinct columns of processing elements, one FIFO column of the plurality of distinct FIFO columns, and one CAM column of the plurality of distinct CAM columns.

In one embodiment, a method for random access augmented flow-based processing within an integrated circuit includes computing, by a plurality of distinct processing cores of an integrated circuit, a plurality of linear indices and a plurality of stores of data; propagating the plurality of linear indices and the plurality of stores of data in a predetermined manner to a plurality of columns of first-in, first-out (FIFO) buffers; loading, from the plurality of columns of FIFO buffers, the plurality of linear indices to a content addressable memory (CAM); at the CAM: coalescing one or more sets of competing linear indices in each of the plurality of FIFO buffers; identifying a winning linear index for each of the one or more sets of competing linear indices; performing lookups for a plurality of memory addresses based on the winning linear indices; writing to random access memory stores of data of the plurality of stores of data that are associated with the winning linear indices.

BRIEF DESCRIPTION OF THE FIGURES

FIG. 4 illustrates a method 400 for implementing in accordance with one or more embodiments of the present application;

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

I. Overview

As discussed above in the background section, the state of the art in integrated circuit architecture lacks a suitable solution for handling the multitude of perception processing tasks of robotics and autonomous machines. While GPUs may be modified with additional and/or disparate circuitry to perform some of these perception processing requirements of robotics and autonomous machines, significant gaps in a GPU's processing capabilities exist such that the resulting performance is low and not in real-time. Other perception processing circuits may exist including neural network-specific processors, computer-vision-specific processors, and the like; however, none of these provide a single comprehensive integrated circuit that is capable of processing the many disparate perception algorithms and computations needed for sensor acquisition, sensor fusion, perception processing, path planning, and the like.

Accordingly, one or more embodiments of the present application function to provide a comprehensive optimized compute platform for processing perception algorithms, perception data (e.g., sensor data and the like), and various perception processing requirements of robotics and autonomous machines. In preferred embodiments, the optimized compute platform may be implemented as a high performance and real-time processing dense algorithm processing unit (DAPU) and/or perception processing unit (PPU). In one or more implementations, the integrated circuit disclosed in the various embodiments of the present application includes an array core having a plurality of disparate processing elements and data flow and storage elements that operate to form a mesh architecture enabling the movement of data among and between many combinations of processing elements within the array core.

The mesh architecture defined by the plurality of processing elements in the array core preferably enable in-memory computing and data movement, as described in U.S. Pat. No. 10,365,860, U.S. application Ser. No. 16/292,537, and U.S. Provisional Application Nos. 62/649,551 and 62/649,551, which are all incorporated herein in their entireties by this reference and further, enable a virtual partitioning of the array for improved computational efficiencies.

II. A System Architecture of a Dense Algorithm and/or Perception Processing Circuit (Unit)

Figure 1:
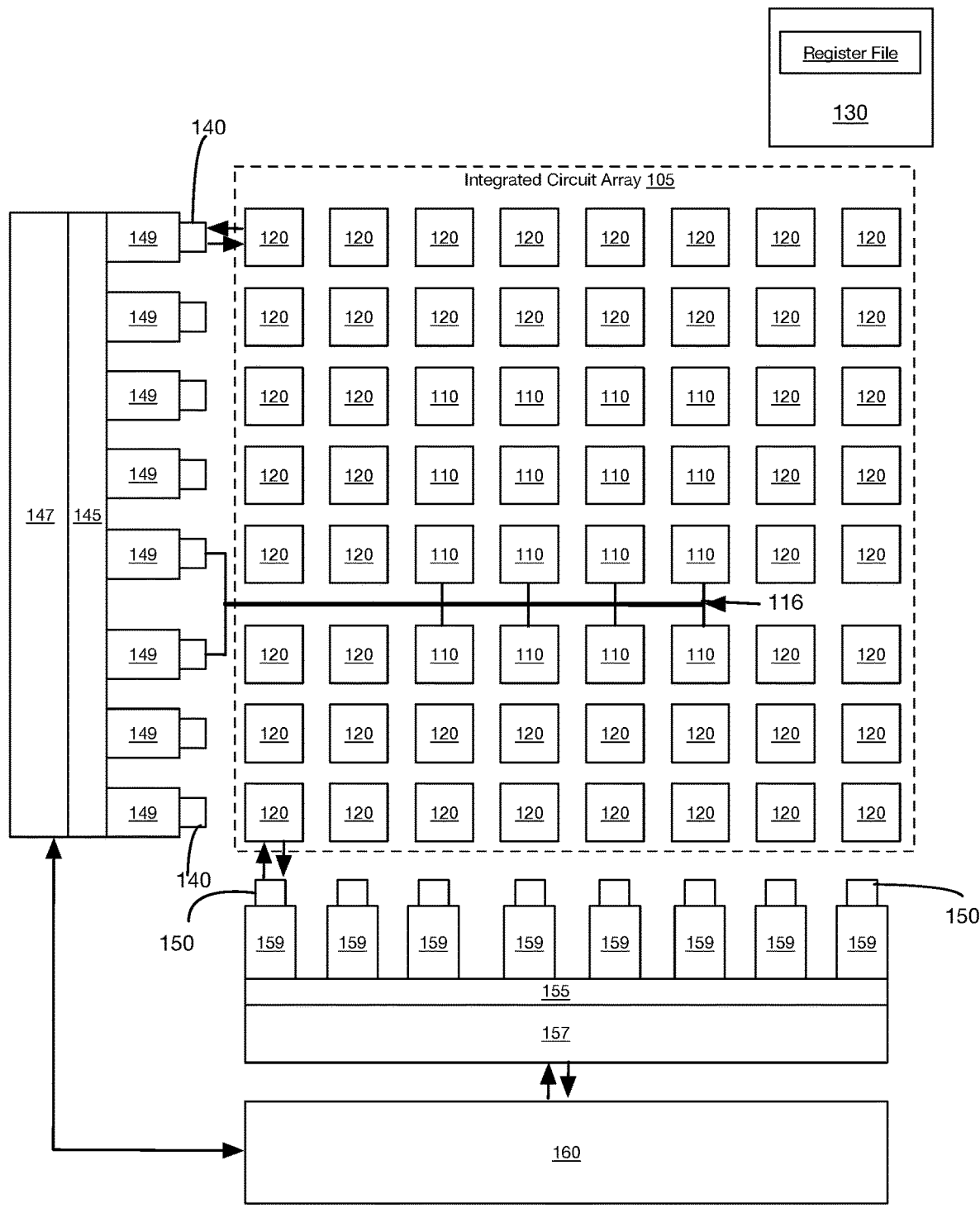
FIG. 1 illustrates a schematic of a system 100 in accordance with one or more embodiments of the present application.

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

Figure 2:
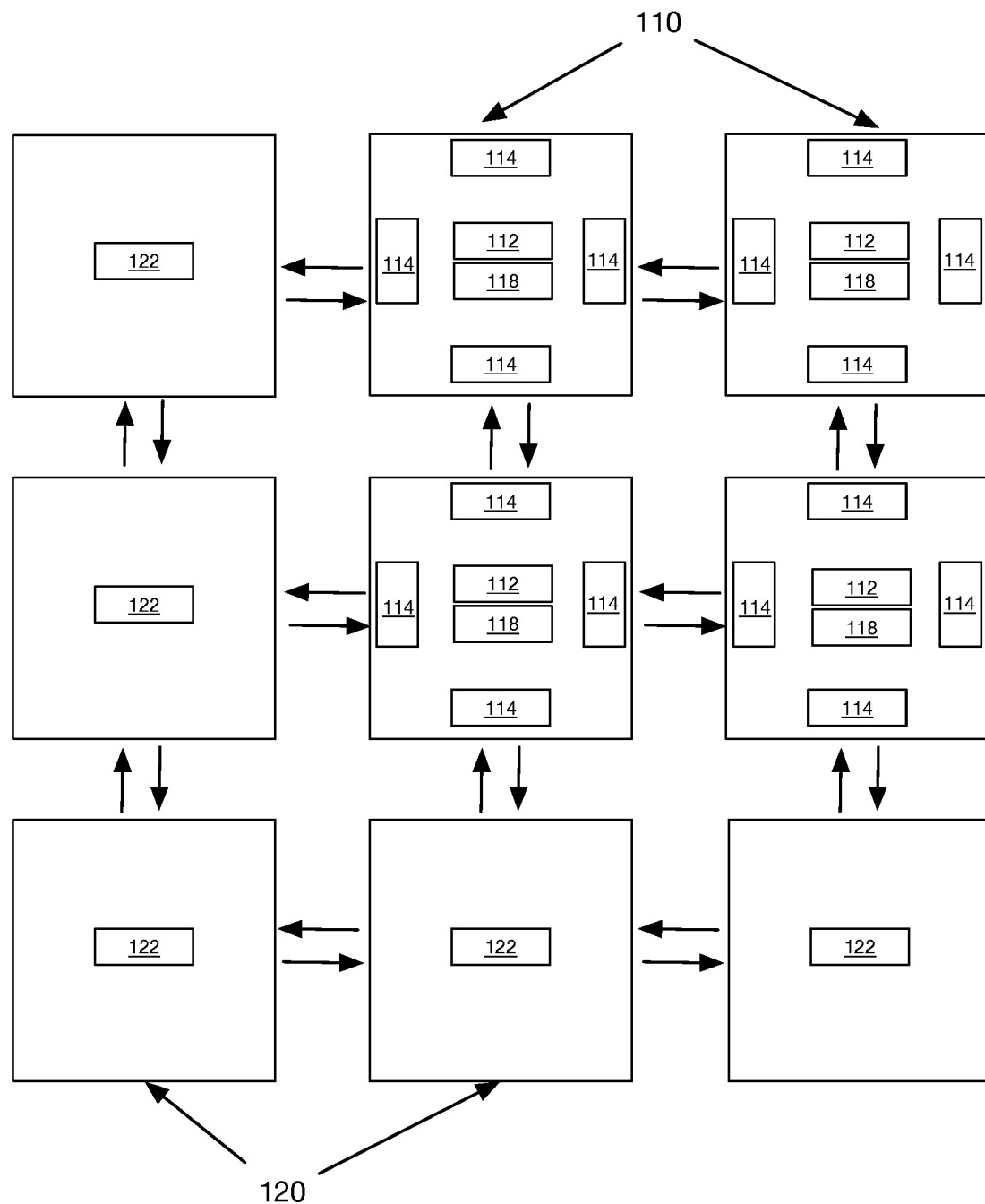
FIG. 2 illustrates a detailed schematic of a segment of the integrated circuit array 105 in accordance with one or more embodiments of the present application.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110, as shown by way of example in FIG. 2. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit 100. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

Figure 3A:
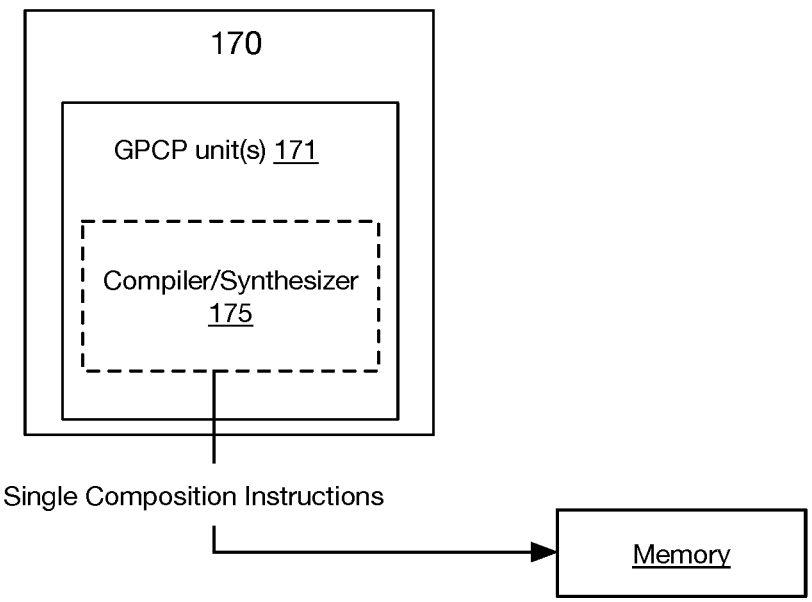
FIG. 3A illustrates a schematic of an instructions generator in accordance with one or more embodiments of the present application.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general-purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

Figure 3B:
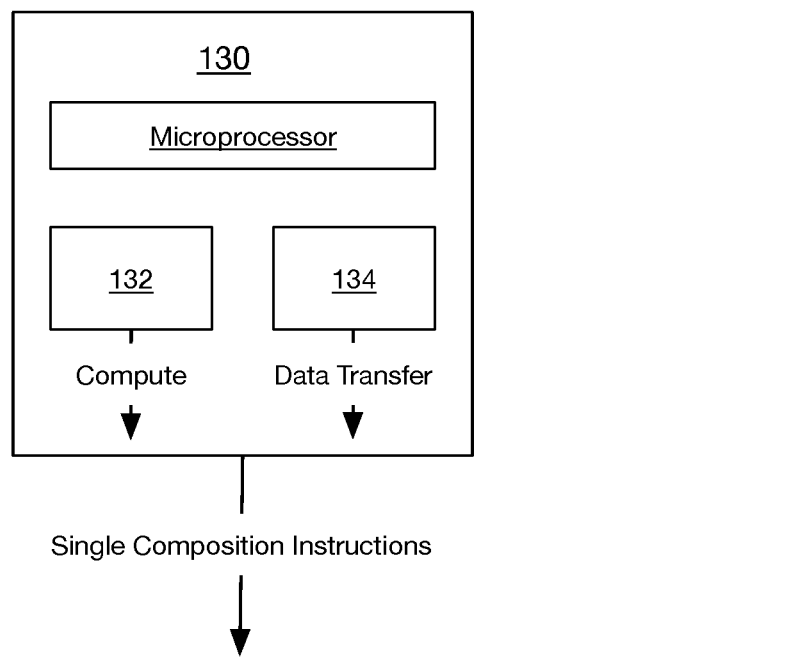
FIG. 3B illustrates a schematic of an integrated circuit controller in accordance with one or more embodiments of the present application.

As shown by way of example in FIG. 3B, in some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

III. Method(s) for Random Access Augmented Flow-Based Processing

As shown in FIG. 4, a method 400 for implementing random access augmented flow-based processing within an integrated circuit includes generating and loading indices S410, implementing a content addressable memory (CAM) for data retrieval S420, coalescing indices along a column S430, coalescing indices along multiple distinct columns S440, memory addressing to one or more of on-chip memory and/or off-chip memory S445, and distributing data from the data buffer S450.

The method 400 preferably functions to enable reading and/or writing to random access memory implemented with a predetermined flow-based integrated circuit architecture. In one or more embodiments, the method includes coalescence techniques that allow for efficiencies in computing requests for random data, address mapping techniques that uniquely map valid indices to memory addresses, one or more techniques for returning data and reading data from a data buffer for additional computational efficiencies, and the like.

4.1 Valid Index Generation

S410, which includes generating and loading indices, may function to enable each of a plurality of processing elements within a multi-column array of processing elements to generate an index and load the index in a predetermined manner for retrieving one or more data elements for processing. In one or more embodiments, the method 400 may preferably be performed by and/or in conjunction with an perception processing unit, such as described in integrated circuit 100, for example. In such embodiments, each of the plurality of processing elements generating indices to be loaded may define one or more components of a plurality of array cores (e.g., array cores 112) of a perception processing unit.

Additionally, an index as referred to herein preferably relates to an offset within an n-dimensional tensor that is distinct from a memory location or memory address. For instance, in a programming model, first class objects, such as indices, may be tensor objects having a partially defined computation or the like that eventually produces a value. Accordingly, an index may variably relate to or may be utilized as a request for a target dataset made preferably without a typical memory address. In such embodiments, the index may include a value or content that may be used as a reference for performing a lookup for a memory address or the like.

It shall be known that, in one or more variants of the embodiments of the present application, the one or more processing elements of an integrated circuit may function to generate any suitable value (distinct from an index) or content that may be used by one or more downstream processes or components (e.g., a CAM or the like) of an integrated circuit to perform a lookup, a search, a pairing, a mapping or otherwise, identification of one or more memory addresses for requesting data from an on-chip or off-chip memory.

In an additional and/or alternative implementation of the method 400, S410 may function to enable each of the plurality of processing elements of a multi-column array of processing elements to generate an index together with a store of data to be written to random access memory. Preferably, the store of data includes a computational output of one of the plurality of processing elements within the array of processing elements. In this implementation, the index associated with the store of data preferably points to a memory address within random access memory to which the store of data should be written.

Additionally, or alternatively, S410 may enable the index and the store of data to propagate together with (i.e. in parallel) or contemporaneously out of the multi-column array of processing elements towards the FIFO buffers and CAM. In a contemporaneous propagation, the index may travel immediately before the store of data or the store of data may travel immediately ahead of the index.

Figure 5:
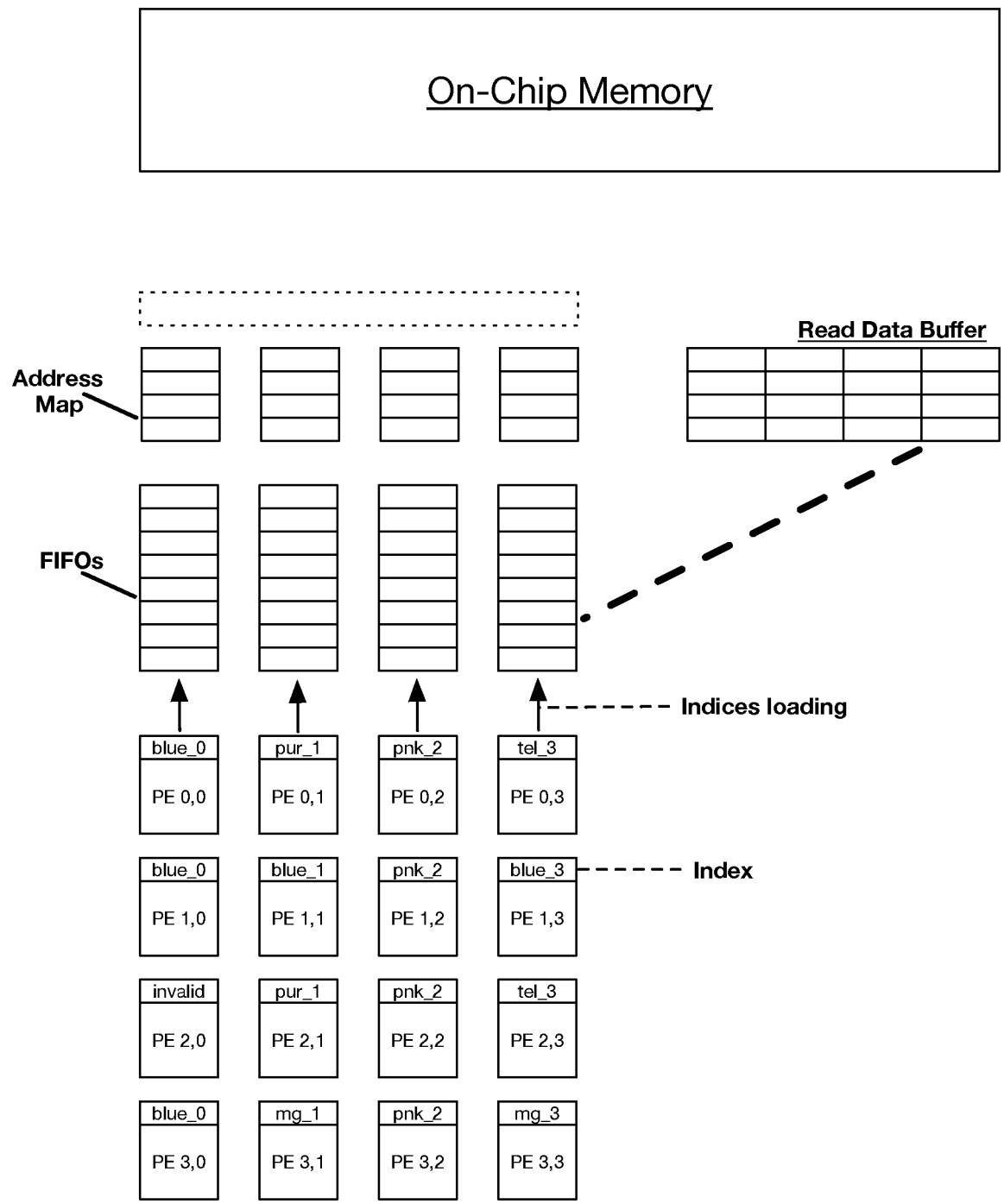
FIG. 5 illustrates a schematic representation of index loading in accordance with one or more embodiments of the present application.

In a preferred embodiment, each of a plurality of processing elements in a multi-column array of processing elements may function to generate a linear index together with a valid bit, as shown by way of example in FIG. 5. A valid bit as referred to herein preferably relates to a single bit (variably, multiple bits) or a data value indicating that selected data (i.e., data sourced based on a linear index or the like) may be required by a specific processing element within the multi-column array of processing elements. That is, a valid bit may be used to confirm or inform that a specific processing element requires a dataset retrieved from memory. Thus, in some embodiments, a valid bit may function to indicate a validity of a request for data (i.e., an index) as well as function as a unique signature of a distinct processing element making the request for data.

Additionally, or alternatively, in one or more embodiments, valid bits may be stored alongside a random access memory (e.g., a reading data buffer) storing pieces of data retrieved from one or more of an on-chip memory and an off-chip memory. In such embodiments, the valid bits may be used as a reference or the like to the read data buffer that identifies whether a distinct column of FIFOs and/or a distinct column of the multi-column array of processing elements requires multiple distinct datasets or multiple distinct data elements along a line of data the read data buffer.

Additionally, or alternatively, in one or more embodiments, S410 may function to bias an address or an index as invalid (i.e., with an invalid bit) unless a processing element or the like designates the address or the index as valid with a valid bit. An invalid bit as implemented, in one or more embodiments, through the multi-column array of processing elements may function to prevent or block a processing by a given processing element of a dataset not having a valid bit or a dataset that has or that may be associated with an invalid bit. Accordingly, at least one technical benefit of a valid or an invalid bit may include the encouragement of processing of valid datasets and the blocking of unnecessary processing of invalid datasets which improves a processing efficiency of the integrated circuit.

Additionally, or alternatively, in some implementations, a valid bit may be augmented to a corresponding linear index and may function to flow or travel along with the corresponding linear index so that a determination of whether a target dataset sourced based on the corresponding linear index is needed by a specific processing element within an array of processing elements may be determined. That is, in some embodiments, a valid bit may have multiple purposes including, but not limited to, (i) acting as a positive indicator that an associated or corresponding index from a given processing element may be a valid and (ii) as an indicator to a read data buffer or the like that the given processing element requires target data stored by the read data buffer.

As described in more detail below, in one or more embodiments, valid bit data may be referenced by the read data buffer to maintain or hold open a line along a crossbar or the like to target data if multiple valid bits indicate that multiple entries of a distinct column of FIFOs and/or multiple distinct processing elements of a distinct column of processing elements require multiple distinct pieces of data from a line of data of the read data buffer. Thus, in such embodiments, a read data buffer may maintain open a line of data along a crossbar or the like to a given column of FIFOs or a given column of processing elements for multiple clock cycles matching a number of valid bits referencing distinct pieces of data required by processing elements within the given column of processing elements.

Additionally, or alternatively, in a preferred embodiment, S410 may function to enable linear indices generated by the plurality of processing elements to propagate or travel along a single predetermined direction out of the multi-column array of processing elements defined by the plurality of processing elements. In one embodiment, S410 may function to enable a predetermined flow of linear indices out of a multi-column array of processing elements through a peripheral border of the multi-column array defined by an outermost extent of each distinct column of the multi-column array along the peripheral border, In one non-limiting example, S410 may function to enable linear indices to flow in a predetermined manner in a northern direction along each column of the multi-column array of processing elements and exit a north side thereof. In a preferred embodiment, the linear indices may flow out from each respective column of processing elements and into a corresponding column of FIFOs. A similar flow of the linear indices may be achieved within and/or through the multiple distinct columns of FIFOs. Preferably, the column of FIFOs include a plurality of distinct FIFOs arranged in a manner that enables the column of FIFOs to store, move, and handle indices and/or any suitable data in a first-in, first-out (FIFO) basis. In some embodiments, each of the column of FIFOs comprises a FIFO queue or a FIFO data buffer, such as a circular buffer, a peripheral buffer or the like. It shall be noted, however, that while in some embodiments, a northern flow and exit to a northern side of distinct columns of processing elements and/or distinct columns of FIFOs, S410 may function to enable a flow of linear indices in any suitable direction based on an n-dimensional coordinate system of a given perception processing unit (e.g., integrated circuit 100). For instance, linear indices may flow out of a southern border or side of an array of processing elements. Similarly, or alternatively, linear indices may flow out of lateral (e.g., east and/or west) sides of the array of processing elements.

4.2 Content Addressable Memory (Coalescence & Broadcasting)

S420, which includes implementing an associative memory or storage for lookup and/or data retrieval, may function to implement a content addressable memory (CAM) that may function to perform a fast lookup and/or a search for a target memory address based on a given index. In a preferred embodiment, a CAM cooperating with an upstream source, such as a multiple columns of FIFOs and/or a multi-column array of processing elements, may function to receive a plurality of indices and perform searches for multiple distinct memory addresses based on the plurality of indices.

In one or more embodiments, indices flowing and/or sourced from a plurality of upstream processing elements and/or FIFOs may be received at a plurality of distinct CAM columns. In such embodiments, a configuration of an integrated circuit implementing the method 400 may include a (linear) columnar alignment between each of one distinct column of processing elements, one distinct column of FIFOs, and one distinct column of a CAM/address map. In this way, a tri-column alignment between the one distinct column of processing elements, the one distinct column of FIFOs, and the one distinct column of a CAM/address map continues to enable an efficient predetermined flow of data within the integrated circuit since a movement of the indices produced by the processing elements may be limited to a single linear direction when traveling from a source processing element to a destination entry of a CAM.

In a non-limiting example, each CAM may comprise a 32-entry CAM, however, it shall be noted that a CAM may include any suitable number of entries including more or less entries depending on a configuration of the processing elements within a multi-column array of processing elements. For example, in some embodiments, each CAM may include 8 entries, 16 entries, 32 entries, 64 entries or the like that preferably corresponds to a size of an array of processing elements. In one example, a 16×16 array of processing elements may have a corresponding 16-entry CAM. In another example, a 64×64 array of processing elements may have a corresponding 64-entry CAM and so on.

In one or more embodiments, S420 may function to implement the CAM to identify and/or retrieve memory address values based on the one or more indices received at the CAM. In one implementation of the CAM, each distinct index may form a distinct key→value pair with a distinct memory address whereby the index is the key and the distinct memory address is discoverable value. That is, given an index, a CAM may function to perform a search and/or perform a mapping using the index to identify a corresponding memory address.

Additionally, or alternatively, S420 may function to implement the CAM with count functionality that enables each distinct column of a multi-column CAM to increment a counter based on unique indices or otherwise, track unique indices within the multiple columns of FIFOs. That is, in such embodiments, the CAM may function to perform a single search or lookup per unique index irrespective of a number of instances that the unique index emerges or appears as a distinct entry within one or more of the multiple columns of FIFOs.

It shall be noted that the CAM may be any suitable CAM and/or associative storage circuit, memory, chip, and/or device including, but not limited to, a binary CAM, a Ternary CAM, and/or the like.

In a variant, S420 may function to implement an integrated CAM and RAM in which the CAM and RAM functionalities are combined into an a single-integrated memory module that may function to perform memory address lookup and/or address mapping based on an index and further, retrieves pieces of data based on the results of the address lookup.

4.3 Single Column-Based Coalescing

Figure 6:
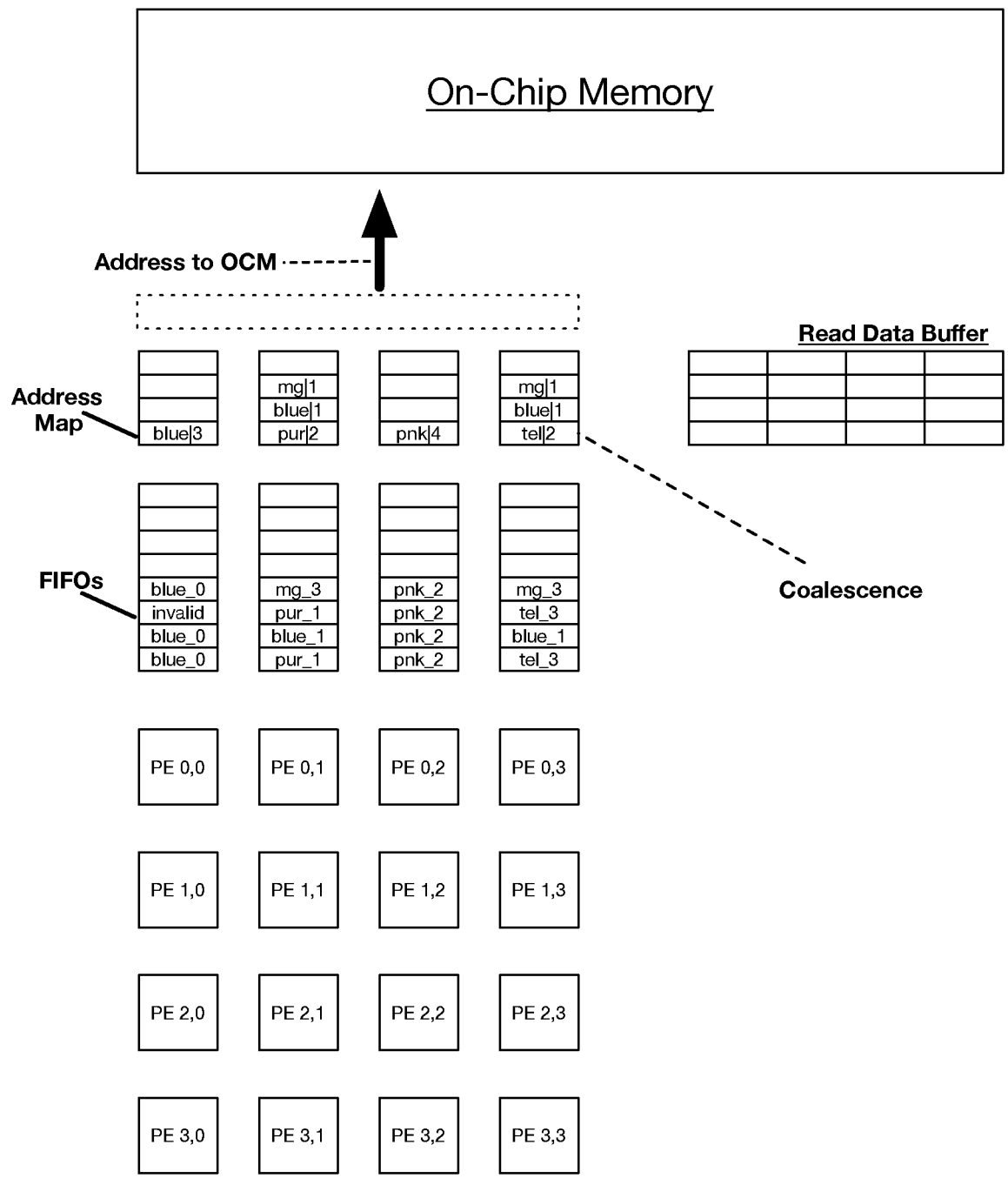
FIG. 6 illustrates a schematic representation of index coalescence in accordance with one or more embodiments of the present application.

Additionally, or alternatively, S430, which includes coalescing indices along a column, may function to implement a single-column-based coalescing of redundant or indistinct indices, as shown by way of example in FIG. 6. That is, in a preferred embodiment, a CAM may function to group together into a single CAM entry redundant indices and/or redundant requests for data of the same type that may be sourced from a plurality of entries in a given column FIFO and/or along a given column of processing elements or the like. For example, the CAM may receive a first index associated with a target memory address storing a target dataset from a first column FIFO and may function to receive a second index associated with the target memory address storing the same target dataset from the same first column FIFO. In such preferred embodiment, an entry for the index for the target dataset is preferably not duplicated along any of the columns of the CAM. Rather, the CAM may function to increment a count associated with the CAM entry for the index (i.e., the first index entry) that was received and/or first recognized by the CAM indicating that another request (i.e., a second (indistinct) index) was identified or received by the CAM. In this way, in such embodiments, only unique instances of an index may be maintained along the one or more entries and/or columns of a CAM.

Additionally, or alternatively, the CAM may include a first bit that indicates that a unique address associated with an index has been sent out for data retrieval so that subsequent and/or redundant indices to the CAM are not given a unique entry in the CAM and further, no redundant lookups of the unique address or fetching of data are performed on the basis of a repeated index. Accordingly, a technical advantage achieved by this technique includes, at least, an improved latency and improve power performance or efficiencies of an integrated circuit implementing the method 400 because less work is performed by an integrated circuit in the address lookup and fetching of data when redundant indices and/or a memory addresses are recognized by the CAM.

4.4 Multiple Column-Based Coalescence

S440, which includes coalescing indices along multiple distinct columns, may function to perform multi-column-based coalescence of redundant or indistinct indices across multiple columns of a CAM. That is, in addition or alternative to a single column-based coalescence, S440 may function to implement a coalescence technique across multiple distinct columns of a CAM to reduce and/or eliminate redundant or indistinct index lookups or fetching of previously requested data. For instance, in the circumstance that a plurality of distinct columns of a CAM may require and/or intend to make a request for a target data based on a memory address discovered using a plurality of redundant or indistinct indices, the multi-column coalescence technique reduces the potential multiple requests for the target data to a single request for the target data made by a single column of the plurality of distinct columns of the CAM. Thus, the multiple indistinct indices or multiple redundant requests for a same piece or pieces of data along the multiple distinct columns may be aggregated and attributed to a single coalesced index within the CAM.

In a preferred implementation, a distinct column of a multi-column CAM may function to receive a unique index. In response to receiving the unique index, S440 may function to broadcast data associated with the unique index and/or memory address that the CAM column intends to retrieve to each of the other distinct columns of the multi-column CAM. Based on a receipt and/or identification of the unique index data or memory address from the broadcasting column of the CAM, the distinct columns receiving the broadcast may function to perform an internal lookup that may function to cause an internal inspection of each entry of the respective distinct column to determine whether or not there is a match between the unique index or memory included with the broadcast and an index or memory address within the one or more entries of the respective column. Preferably, each of the distinct columns receiving the index/memory address broadcast may function to perform an internal lookup based on data associated with the index/memory address broadcast.

Additionally, or alternatively, in the circumstances that a distinct column receiving an index broadcast identifies a matching index, memory address, or data request within at least one index entry along the respective distinct column, S440 may function to enable the distinct column to designate and/or mark the at least one index entry or memory address entry as previously processed and/or flag the at least one entry as a non-distinct or redundant index/memory address entry so that a distinct lookup or address fetch is not performed based on the marked index/memory address entry. Accordingly, in this way, the method 400 may function to perform a fetch and/or reference lookup using only unique index entries or memory addresses across all columns of a multi-column CAM thereby further improving latency and/or power efficiencies (i.e., reducing power consumption due to multiple redundant requests) of an integrated circuit implementing the method 400.

Additionally, or alternatively, in the variant implementation that enables processing elements to write or store stores of data to random access memory, S440 may function variably to implement a competitive coalescence across the multiple columns of FIFO buffers. Accordingly, in the circumstances in which multiple processing elements may attempt to write distinct stores of data to a same index or a same memory address, S440 may function to recognize a winner or a champion between the competing processing elements. In some embodiments, the competitive coalescence selects a first recognized index as a winner and operates to write the store of data of the winner to the corresponding index or memory address of random access memory. Alternatively, the competitive coalescence may select the last recognized index or the index associated with the largest store of data or the like. It shall be noted that the competitive coalescence may function to select a winner or a champion between competing indices in any suitable manner. In some embodiments, the stores of data associated with the indices that are not designated as the winner or the champion are not written to the random access memory.

In the variant implementation, the integrated circuit may include a crossbar or a network of lines between the multiple columns of FIFO buffers and the multiple columns of CAMs that may function to enable the competition between the multiple non-unique indices for storing data to random access memory and a declaration of a winning index between competing non-unique indices. In one non-limiting example, as multiple non-unique indices or indistinct indices traverse the multiple columns of FIFO buffers towards the multiple columns of CAMs, the multiple non-unique indices may be coalesced to a same line towards a distinct CAM column. In such example, S445 may enable the CAM column to select a winner between the multiple non-unique indices competing to store data at a same memory address. Accordingly, continuing with the example, the selected winner or champion index may function to pass it data to be stored or written in random access memory.

S445, which includes memory addressing to one or more of an on-chip memory and/or an off-chip memory, may function to perform one or more of a data fetch and/or a data lookup of requested data based on one or more identified memory addresses. In a preferred embodiment, S445 may function to perform memory addressing on a per column basis. That is, in preferred embodiment, S445 may function to perform memory addressing for each unique index entry along a distinct CAM column before implementing memory addressing at another distinct CAM column of a multi-column CAM. Accordingly, each distinct CAM column may be permitted to send all unique memory addresses or requests for data before a movement to a subsequent or another column of the multi-column CAM and acceptance of unique index requests therefrom may be performed.

Additionally, or alternatively, in some variations, S445 may function to write or store the one or more stores of data based on one or more identified memory addresses.

Additionally, or alternatively, in some embodiments, S445 may allow for a dead cycle (i.e., a cycle in which no memory address are transmitted by a given CAM column or the like). In a preferred embodiment, during a dead cycle, movement from a first distinct CAM column to a next or another distinct CAM column for fulfilling memory addressing may be performed. Additionally, or alternatively, S445 may allow for updates of an address mapping during a dead cycle taking into account memory addresses sent out by each of column of a multi-column CAM.

In one implementation, CAM column-based memory addressing may be performed sequentially (i.e., memory addressing in an ordered fashion from one column to a next adjacent column until all columns of a multi-column CAM are handled). In another implementation, CAM column-based memory addressing may be performed dynamically and/or randomly and preferably, based on identifying which columns of a multi-column CAM includes the most unique index entries or unique memory addresses. In this way, multi-column coalescence and memory addressing may be performed in parallel; ensuring that memory addressing of an index entry within a column and a corresponding index broadcast of the index entry to one or more downstream (or upcoming columns) columns of a multi-column CAM may be performed simultaneously (e.g., within the same clock cycle) or contemporaneously (e.g., within one to three clock cycles or so of each other) thereby improving a computing and/or data processing efficiency of an integrated circuit implementing the method 400.

4.5 Crossbar Traversal & Data Line Holding

In one or more embodiments, as data is returned from one or more of an on-chip memory and of an off-chip memory, the data may be stored into a random access memory (e.g., a read data buffer or the like). In some embodiments, a read data buffer may include and/or operate with select logic that may be based on one or more bits in an address map and/or any suitable storage device that may function to indicate where each data element within the read data buffer should be sent. That is, the select logic may function to indicate to which column(s) of a multi-column FIFO or of a multi-column array of processing elements that each data element within the read data buffer will go.

Figure 7:
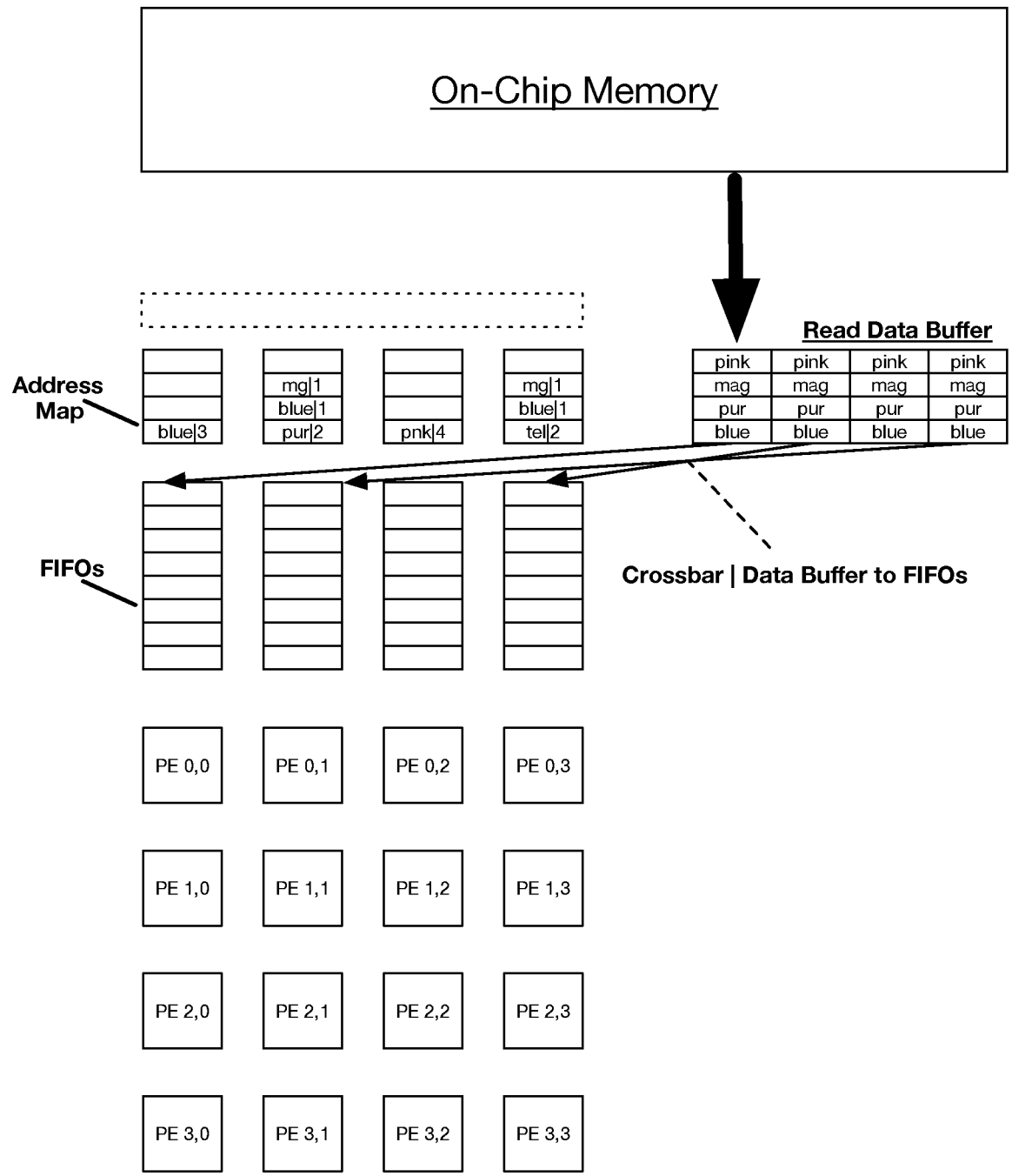
FIG. 7 illustrates a schematic representation of implementing a data buffer and crossbar traversal in accordance with one or more embodiments of the present application.

As shown by way of example in FIG. 7, S450, which includes copying and/or distributing data from the read data buffer, may function to implement a crossbar or switching element between the read data buffer and the plurality of distinct columns of the multiple columns of FIFOs. It shall be noted that while a crossbar may be illustrated between the read data buffer and the multiple columns of FIFOS, in a variant implementation, a crossbar may be arranged between the read data buffer and the multiple columns of processing elements so that one or more direct lines for communicating data may be established between the read data buffer and the multi-column array of processing elements. In a preferred embodiment, each distinct column of the multiple columns of FIFOs or of a multi-column array of processing elements may be connected to each of the output ports of the read data buffer and therefore, can access any data element stored by the read data buffer and accessible via the output ports.

In one or more embodiments, the data propagating out from the read data buffer may be transmitted to the multiple columns of FIFOs or the distinct columns of the multi-column array of processing elements based on an order (e.g., FIFO) in which a memory addressing for fetching data within the read data buffer was sent out from the plurality of CAM columns. However, in a variant of such embodiments, S450 may function to implement a data line maintenance and/or a data line holding technique that partially or fully overrides the order (e.g., FIFO). In such embodiments, S450 may function to maintain or hold open a line of data within the read data buffer to a distinct column of the multiple columns of FIFOs or of the multi-column array of processing elements when the distinct column requires multiple distinct pieces of data from the given line of data. A line of data of a random access memory (i.e., the read data buffer) preferably relates to a line of storage across a random access memory storing multiple distinct pieces of data at a same lateral position (i.e., laterally adjacent pieces of data) within the random access memory. Preferably, S450 may function to keep available a given line of data of the read data buffer for a number of clock cycles. In one implementation, data lines to target data within the read data buffer may be held open based on status data and/or status bits identifying requirements for one or more of the plurality of columns of the multiple columns of FIFOs or the multi-column array of processing elements for multiple pieces of data. For instance, in one embodiment, a first FIFO column or a first column of processing elements may require target data (e.g., data_tar) from the read data buffer and thus, may access or retrieve target data via a crossbar to the read data buffer. Additionally, S450 may identify that a second FIFO column or a second column of processing elements requires data_tar based on one or more status bits associated with an address mapping or the like and therefore, function to maintain the data lines to target data (data_tar) so that the second column may function to access and/or retrieve data_tar.

In another implementation, S450 may function to keep open a line of data if a distinct Column FIFO or a distinct column of processing elements requires multiple distinct pieces of data along the line (e.g., data_tar1, data_tar2, data_tar3, etc.).

In one embodiment, the multiple columns of FIFOs and/or the multi-column array of processing elements may function communicate the status of each of the FIFO columns or the columns of the multi-column array of processing elements including communicating a priority encoding scheme that informs a maintenance of a data line to the read data buffer and/or an arrangement of target data within a respective column FIFO or of a respective column of processing elements. In such embodiments, S450 may function to identify a number of FIFO entries of the multiple columns of FIFOs or processing elements across the columns of the multi-column array of processing elements having an unprocessed need (e.g., a status bit indicating a need for data_tar) for the target data and maintain the data lines to data_tar until all columns requiring data_tar has accessed or retrieved data_tar.

Figure 8:
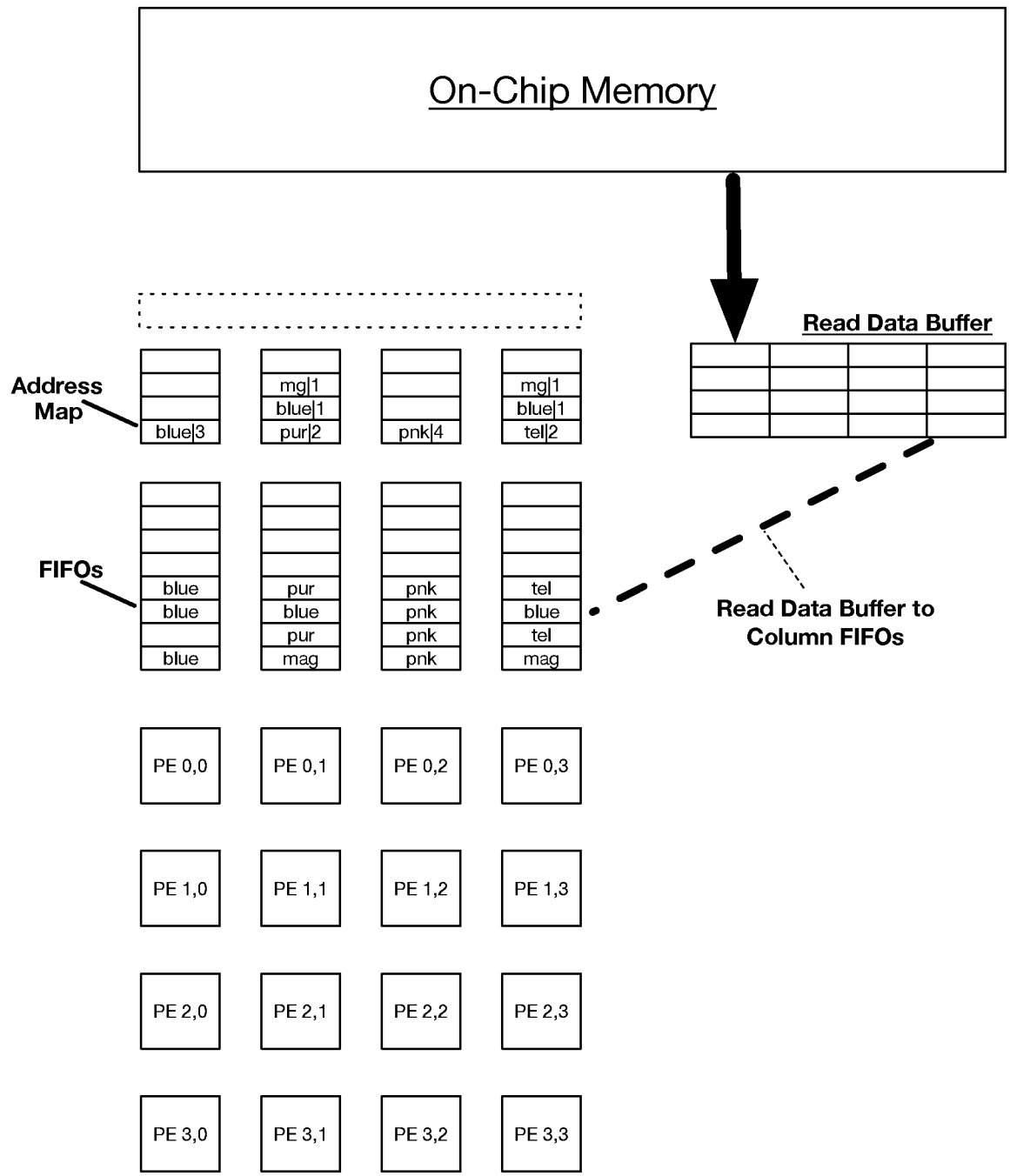
FIG. 8 illustrates a schematic representation of stacking data from a data buffer in accordance with one or more embodiments of the present application.
Figure 9:
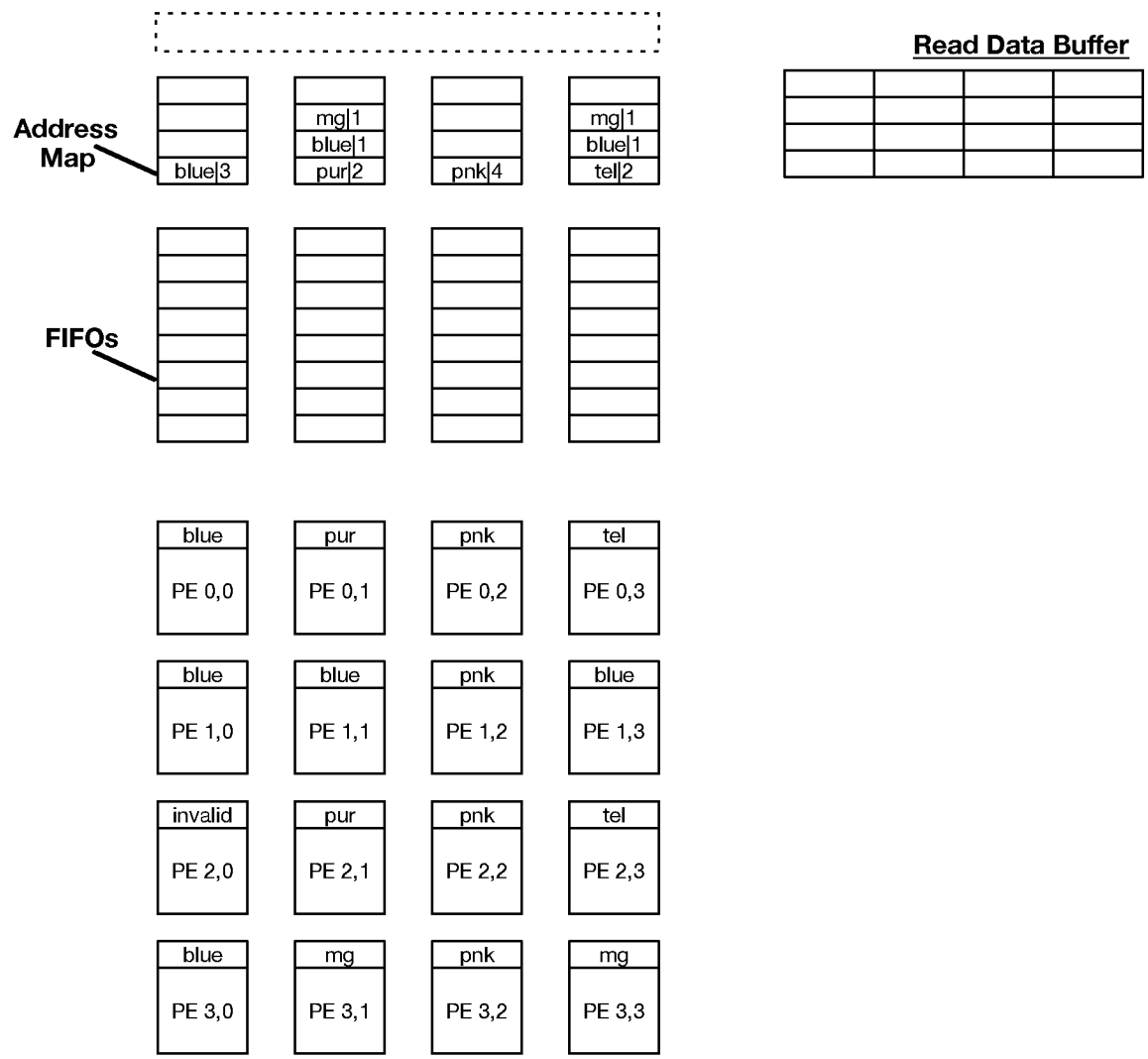
FIG. 9 illustrates a schematic representation of flowing data into an array of processing elements in accordance with one or more embodiments of the present application.

As shown by way of example in FIG. 8, data from the read data buffer may be stacked back into each respective FIFO column of the multiple columns of FIFOs. In such embodiments, the data may be stacked within entries of the FIFOs in an order that enables the data to propagate into a corresponding column of processing elements making the request for the data. Thus, while the data from the read data buffer may not have been received within the column FIFO on a first-in, first-out basis, S450 may function to arrange the data within each column FIFO such that a predetermined propagation of the data from each respective column FIFO into the multi-column array of processing elements allows the data to arrive to the appropriate processing element within the array, as shown by way of example in FIG. 9.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for random access augmented flow-based processing within an integrated circuit, the method comprising:
computing, by a plurality of distinct processing cores of the integrated circuit, a plurality of linear indices and associated valid bits, wherein each of the plurality of linear indices identifies a distinct offset within a n-dimensional tensor that is distinct from a memory location or a memory address, and wherein each of the associated valid bits include one or more bits that indicate that selected data is required by a given processing core within the plurality of distinct processing cores;
propagating the plurality of linear indices in a predetermined manner to a plurality of columns of first-in, first-out (FIFO) buffers;
loading, from the plurality of columns of FIFO buffers, the plurality of linear indices to a content addressable memory (CAM);
at the CAM:
 (i) coalescing redundant linear indices loaded from each of the plurality of FIFO buffers to produce a coalesced set of linear indices;
 (ii) performing lookups for a plurality of memory addresses based on the coalesced set of linear indices;
collecting at a read data buffer a plurality of distinct pieces of data from one of an on-chip memory and an off-chip memory based on the plurality of memory addresses;
reading, by the plurality of columns of FIFO buffers, the plurality of distinct pieces of data from the read data buffer; and
propagating the plurality of distinct pieces of data into the plurality of distinct processing cores.

2. The method according to claim 1, wherein the integrated circuit comprises:
the plurality of distinct processing cores, each processing core of the plurality of distinct processing cores comprising:
 one or more data processing circuits; and
 a register file; and
a plurality of border cores, each border core of the plurality of border cores comprising at least one register file.

3. The method according to claim 1, wherein:
distinct subsets of the plurality of processing cores define a plurality of distinct columns of processing elements;
propagating the plurality of linear indices in the predetermined manner to the plurality of columns of FIFO buffers includes:
 propagating the plurality of linear indices along each of the plurality of distinct columns of processing elements in a predetermined direction towards the plurality of columns of FIFO buffers.

4. The method according to claim 1, wherein:
the redundant linear indices relate to linear indices that are duplicative of prior linear indices within a FIFO column of the plurality of columns of FIFO buffers;
coalescing the redundant linear indices includes:
 coalescing the redundant linear indices as a subset of the plurality of linear indices move along a single FIFO column of the plurality of columns of FIFO buffers.

5. The method according to claim 1, wherein:
the redundant linear indices relate to linear indices that are duplicative of prior linear indices within a FIFO column of the plurality of columns of FIFO buffers;
coalescing the redundant linear indices from the plurality of distinct processing cores includes:
 coalescing redundant linear indices as all of the plurality of linear indices move along all the plurality of columns of FIFO buffers.

6. The method according to claim 5, further comprising:
updating, by the CAM, a count associated with a unique memory address based on the coalescence of the redundant linear indices.

7. The method according to claim 1, further comprising:
coalescing redundant memory addresses across a plurality of distinct columns of the CAM includes:

broadcasting, to a target memory address from a subject column of the CAM to one or more of the plurality of distinct columns of the CAM, linear index data identifying a specific linear index loaded to the CAM.

8. The method according to claim 7, wherein
at each of the one or more of the plurality of distinct columns of the CAM receiving the broadcasting:
performing an internal inspection; and
identifying whether a match exists between the target memory address and one or more entries of memory addresses of the respective CAM column of the plurality of distinct columns of the CAM.

9. The method according to claim 8, further comprising:
in response to identifying a match between the target memory address and one or more entries of memory addresses, designating the one or more entries of memory addresses matching the target memory address as previously processed; and
forgoing a data fetch based on the designated one or more entries of memory addresses.

10. The method according to claim 1, further comprising:
implementing a crossbar between the read data buffer and the plurality of columns of FIFO buffers,
wherein reading the plurality of distinct pieces of data from the read data buffer is performed via the crossbar.

11. The method according to claim 10, further comprising:
holding a line of data open within the crossbar until each of the plurality of columns of FIFO buffers requiring one or more pieces of data from the line of data are satisfied.

12. A method for random access augmented flow-based processing within an integrated circuit, the method comprising:
computing a plurality of indices, wherein each of the plurality of indices identifies a distinct offset within a n-dimensional tensor that is distinct from a memory location or a memory address;
propagating the plurality of indices to a plurality of peripheral buffers;
loading the plurality of indices to an associative memory;
at the associative memory:
(i) coalescing indistinct linear indices loaded from each of the plurality of peripheral buffers to produce a coalesced set of linear indices;
(ii) performing lookups for a plurality of memory addresses based on the coalesced set of linear indices;
returning a plurality of distinct pieces of data from one of an on-chip memory and an off-chip memory based on the plurality of memory addresses; and
propagating the plurality of distinct pieces of data into an array of processing cores of the integrated circuit.

13. An integrated circuit configured to perform the method of claim 12, comprising:
a random access memory;
an on-chip memory,
wherein the associative memory comprises a content-addressable memory (CAM) that is in signal communication with the on-chip memory.

14. The integrated circuit according to claim 13, wherein:
the array of processing cores comprises a plurality of processing elements arranged in a plurality of distinct columns of processing elements;
the CAM comprises a plurality of CAM entries arranged in a plurality of distinct CAM columns;
the peripheral buffers comprise a plurality of first-in, first-out (FIFO) buffers arranged in a plurality of distinct FIFO columns;
a linear columnar alignment is defined by an alignment between:
(i) one distinct column of processing elements of the plurality of distinct columns of processing elements,
(ii) one FIFO column of the plurality of distinct FIFO columns, and
(iii) one CAM column of the plurality of distinct CAM columns.

15. A method for random access augmented flow-based processing within an integrated circuit, the method comprising:
computing, by a plurality of distinct processing cores of an integrated circuit, a plurality of linear indices and a plurality of stores of data, wherein each of the plurality of linear indices identifies a distinct offset within a n-dimensional tensor that is distinct from a memory location or a memory address;
propagating the plurality of linear indices and the plurality of stores of data in a predetermined manner to a plurality of columns of first-in, first-out (FIFO) buffers;
loading, from the plurality of columns of FIFO buffers, the plurality of linear indices to a content addressable memory (CAM);
at the CAM:
(i) coalescing one or more sets of competing linear indices in each of the plurality of FIFO buffers to produce one or more coalesced sets of competing linear indices;
(ii) identifying a winning linear index from each of the one or more coalesced sets of competing linear indices; and
(iii) performing lookups for a plurality of memory addresses based on the winning linear index from each of the one or more coalesced sets of competing linear indices; and
writing to random access memory stores of data of the plurality of stores of data that are associated with the winning linear the winning linear index from each of the one or more coalesced sets of competing linear indices.

* * * * *